US005926320A

United States Patent [19]

Parkyn, Jr. et al.

[11] Patent Number: 5,926,320

[45] Date of Patent: Jul. 20, 1999

[54] RING-LENS SYSTEM FOR EFFICIENT BEAM FORMATION

[75] Inventors: William A. Parkyn, Jr., Hawthorne; John M. Popovich, Del Mar, both of Calif.

[73] Assignee: Teldedyne Lighting and Display Products, Inc.

[21] Appl. No.: 08/864,840

[22] Filed: May 29, 1997

[51] Int. Cl.[6] .......................... G02B 27/30; G02B 27/10

[52] U.S. Cl. .......................... 359/641; 359/618

[58] Field of Search .......................... 359/618, 742, 359/748, 640

[56] References Cited

U.S. PATENT DOCUMENTS 4,770,514 9/1988 Silverglate .......................... 350/443

*Primary Examiner*—Georgia Epps
*Assistant Examiner*—Michael A Lucas
*Attorney, Agent, or Firm*—Robert J. Pugh

[57] ABSTRACT

This invention consists of a highly efficient beamforming system of ring-lens elements that may be used in automobile headlights, flashlights, and for other lighting products. The lens captures most of the light from an omnidirectional source, so that light from a solid angular cone of nearly 4 steradians is utilized with little or no reliance on a metallic reflector. The surfaces of the lens elements may be formed integrally with a hot light source, such as an incandescent lamp, so that the filament of the light source is inserted directly into an internal cavity of the lens. The lens may also be formed in optical contact with a cold light source, such as a light emitting diode, to reduce Fresnel losses and increase light utilization efficiency. An integrated system of optical surfaces collects light, including downwardly-directed light, from the source to further increase light utilization to a high efficiency of 75–90%. The number of surfaces on the lens are at least three, and one or more of these surfaces use total internal reflection (TIR) to redirect the light. The lens may be formed in either a two piece construction or a one piece construction having an internal air gap. The lens may be made from silicone or a high temperature glass having a low thermal expansion coefficient.

37 Claims, 10 Drawing Sheets

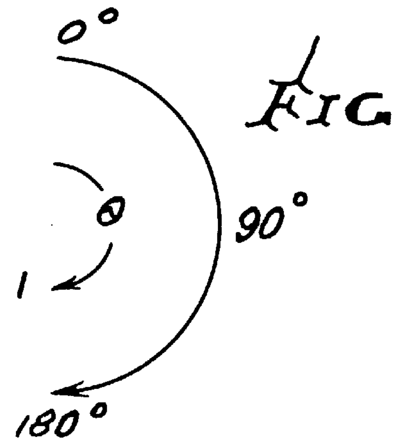
FIG. 1a.
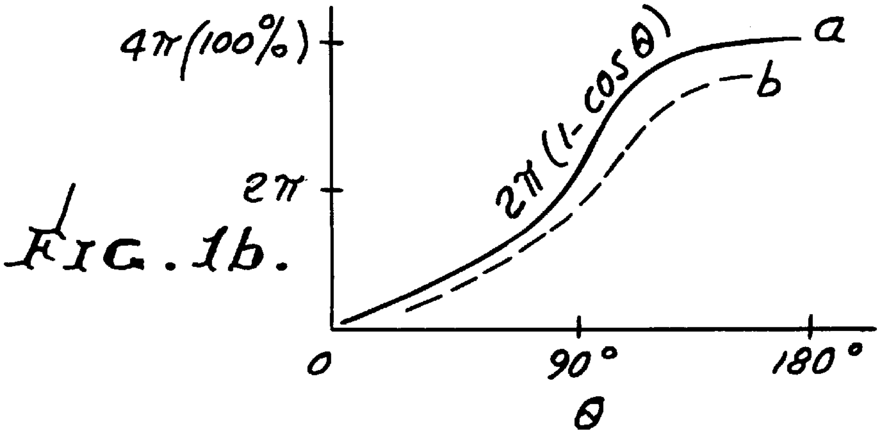
FIG. 1b.
FIG. 2a.
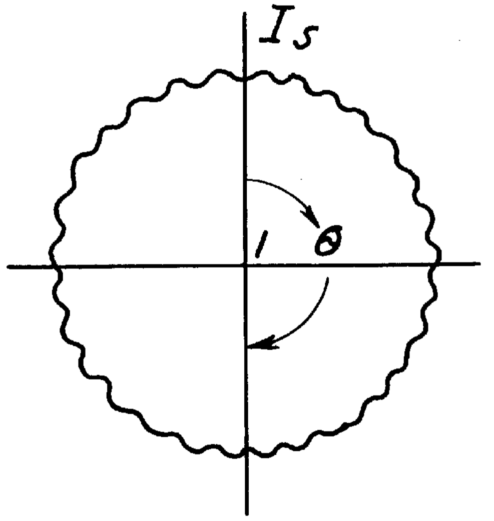
FIG. 2b.
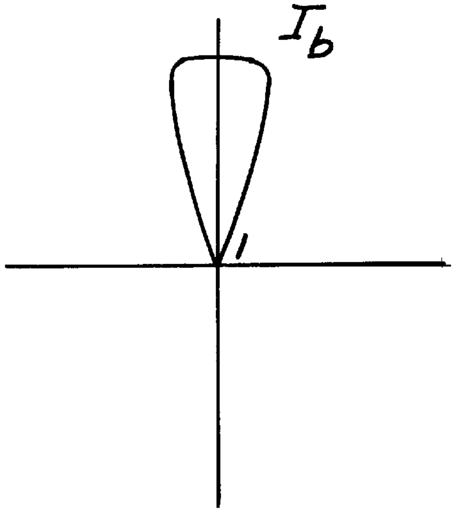

RING-LENS SYSTEM FOR EFFICIENT BEAM FORMATION

BACKGROUND OF THE INVENTION

This invention consists of a highly efficient beamforming system that captures most of the light from a substantially omnidirectional source, without the need for mirrors and their attendant surface losses. One or more of the lens elements are centrally situated to be either integral with a hot light source or in optical contact with a cold light source. A hot light source, such as an incandescent lamp, is one that operates via thermal emission from a component (i.e., filament) that is at an elevated temperature. Other examples are arc lamps and discharge lamps. A cold light source utilizes some other means than heat to generate light. Examples include light emitting diodes, electro-luminescent light sources, and chemoluminescent (also called phosphorescent) sources. The present invention is particularly applicable to transportation headlamps for automobiles and bicycles, as well as to flashlights or any other lighting product that would conventionally utilize a metallic reflector. The present invention seeks to eliminate the need for a metallic or other reflector, and instead use only total internal reflection (TIR) and refraction.

A relevant prior art approach is disclosed by Janis Spigulis, "Compact dielectric reflective elements. I. Half-sphere concentrators of radially emitted light," Applied Optics, 33(35), Sep. 1, 1994, pages 5970 to 5974. This paper, however, is only concerned with forming a beam from the upward-going light, while the downward-going light requires a metallic reflector. For dealing with downward-going light, reflectors have several disadvantages: (1) reduced optical efficiency; (2) problems with integrating the reflected light with upward-going light; (3) increased cost and mechanical complexity. Accordingly, the present invention seeks to dispense with metallic or other type reflectors by using a second -outer transparent optical element to redirect the downward-going and sideways-going light into an annular beam, one that surrounds the beam formed from the upward-going light.

Automobile headlights typically have a light collecting efficiency of only twenty to thirty-five percent from the lamp to the beam. The present invention arms to eliminate or at least reduce the need for metallic reflectors in order to increase the light utilization efficiency from the filament to the beam to the range of seventy-five to ninety percent. Increased light utilization efficiency translates into a better level of road illumination or reduced electrical power consumption.

SUMMARY OF THE INVENTION

The present invention is a device that has increased light utilization efficiency over the prior art. Through total internal reflection and refraction, it forms one beam from a portion of the upward-going light and redirects the rest of the source's light into a surrounding beam, with little or no reliance on a metallic or other reflector. The present invention may in some instances optionally use an integral reflector made of a metallic coating, but redirection of light is mainly accomplished by surfaces that produce total internal reflection (TIR) and refraction.

In one particular embodiment the lens is made from a silicone material (refractive index 1.43) to withstand the elevated envelope temperatures of incandescent light sources, which often are too hot for many transparent optical polymers. Other advantages of using silicone is that it is possible to form it with low pressure, and that because of its rubbery elasticity it can be molded with a negative draft, which allows a greater range of shapes. The lens may also be made of glass, in particular a high temperature glass, albeit one with a very low thermal expansion coefficient because of the thicknesses involved. In this way the inner lens element can form the envelope of an incandescent source. With cold light sources, the only requirement on the optical material is that it be transparent in the source's output wavelength range.

The present lens collects light from a solid angular cone of nearly 4π steradians, limited mainly by the source's support structure, base and connector, which are typically opaque. This lens consists of an integrated system of at least three optical surfaces. Generally there are more, comprising an inner lens element surrounding the light source and an outer lens element. These two lens elements may be separate concentric pieces, or part of a monolithic lens with an internal air gap. The lens elements may be made of the same or different optically transparent materials, with the relative sizes of the at least three optical surfaces being dependent upon the relative refractive indices of the two materials. In the preferred embodiment, one of these optical surfaces may be ellipsoidal or nearly ellipsoidal, and is situated atop the light source to produce an innermost collimated beam, by refraction alone. Another surface is paraboloidal or nearly paraboloidal, acting by total internal reflection to redirect light upwards. The third surface is situated atop the second, and is typically a cone surface. Additional surfaces may be toric or nearly toric. By a "nearly" ellipsoidal, "nearly" paraboloidal or "nearly" toric surface, we mean that these surfaces are basically of one of these forms, but are somewhat modified to accommodate the shape of a source or its envelope. These surfaces can also be modified to permit ease of manufacturing. The entire lens structure may be formed as an axially symmetric surface of revolution, or the surface may be stretched from an axially symmetric configuration to accommodate a non-circular source or to tailor the beam forming profile. The surfaces of the lens can be smooth or formed as a faceted surface.

Each of the plurality of surfaces of the lens comprise colatitude sectors that have different beam forming properties. The net effect of each of the plurality of colatitude sectors is to act together to form a contiguous or nearly contiguous beam. The bottom colatitude sectors are particularly designed to take light rays that are normally outside the total internal reflection range of the top colatitude sectors and bring these rays to a useable more upward direction.

The present lens has the particular advantage that it can be formed integrally or in optical contact with the light source. This reduces Fresnel reflections that would normally occur between the light source and lens element so that the overall light utilization efficiency is increased. The interior surface of the lens optically contacts the envelope or defines the cavity for the filament in the case of an incandescent light source. The interior surface of the lens is in optical contact with the transparent package in the case of a light emitting diode.

The lens may be used to collimate, focus, or diverge light, depending upon the particular application. The parameters of the lens may also be varied to tailor the output properties of the beam depending upon the directional properties of the light source. The lens may be designed to take into account the characteristics of such extended light sources as incandescent filaments sources and discharge arcs.

OBJECTS OF THE INVENTION

One object of this invention is to increase light utilization by reducing Fresnel reflections at the boundary between a light source and a lens element, by making the lens element integral or in optical contact with the light source.

Another object of this invention is to increase fight utilization to nearly 4π steradians with reduced dependence on an external light reflector by including lens sectors that produce total internal reflection of light from the bottom hemisphere of the light source.

BRIEF DESCRIPTION OF THE DRAWINGS

FIG. 1(*a*) shows the radiation pattern of an isotropic light source.

FIG. 1(*b*) shows the cumulative integrated light intensity from the light source of FIG. 1(*a*).

FIG. 2(*a*) shows an arbitrary intensity distribution pattern from a light source.

FIG. 2(*b*) shows the intensity distribution produced by the function of a lens element of the present invention.

FIG. 4 shows a ray tracing of a second embodiment of the present invention.

DETAILED DESCRIPTION OF THE PREFERRED EMBODIMENTS

FIG. 1(*a*) illustrates a schematic isotropic light source 1. Source 1 radiates over a colatitude angle θ from 0 to 180 degrees. The number of steradians in the fractional sphere defined by θ is given by $2\pi(1-\cos\theta)$. Thus, radiation over $\theta \leqq 90$ degrees corresponds to 2π steradians (i.e. a hemisphere), while radiation over $\theta \leqq 180$ degrees corresponds to 4π steradians. Curve a in FIG. 1(*b*) shows this relation, which is the cumulative integrated quantity of light up to an angle θ. The measured cumulative integrated quantity of light from a real source over angle θ is shown by curve b in figure 1(*b*).

In general, it is desirable to create a beam with an intensity distribution pattern, $I_b$, shown in FIG. 2(*b*), with the lens of the present invention from a source intensity distribution pattern, $I_S$, shown in FIG. 2(*a*). There is thus a function $\theta_b(\theta_s)$ that describes the action of the lens. The variables to be included in the desired light distribution pattern, $I_b$, include the colatitude, θ, and the longitude, ψ. The adaptation of the present invention to a particular source can use the method disclosed by Robert D. Stock and M. W. Siegel, "Orientation invariant light source parameters," Optical Engineering, 35(9), September 1996, pages 2651 to 2660, and M. W. Siegel and Robert D. Stock, "General near-zone light source model and its application to computer-automated reflector design," Optical Engineering, 35(9), September 1996, pages 2661 to 2679, as an analytical tool to optimize lens parameters based on the desired characteristics of the output beam. These articles describe a technique that analyzes the light output by taking a Fourier transform of multiple pinhole spots from the light source. This technique allows one of skill in the art to map an output distribution $\theta_b(\theta, \theta_s)$ as a function of colatitude angle θ. Nonisotropic light sources such as linear filaments can also modeled with this technique.

Figure 3:
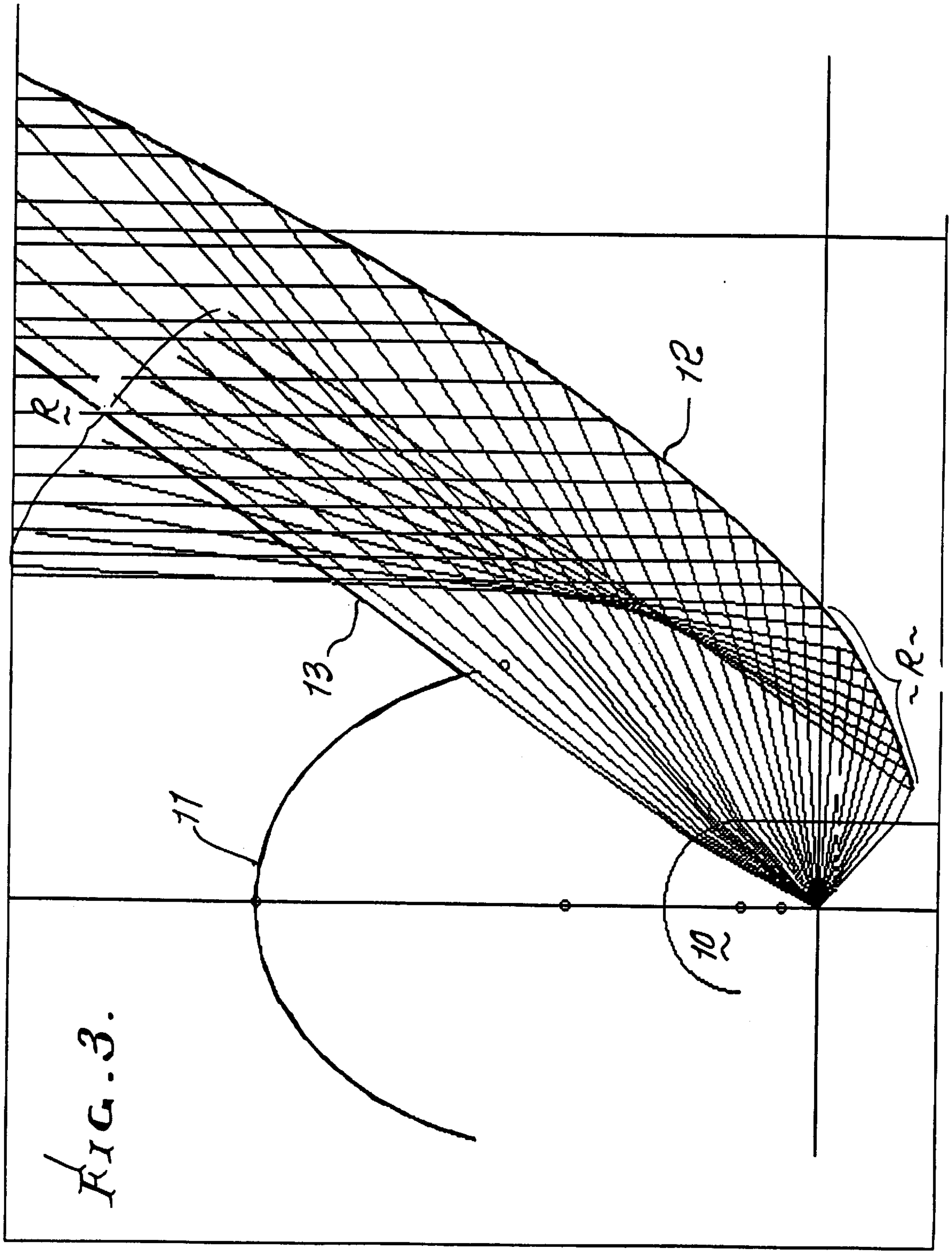
FIG. 3 shows a ray tracing of a first embodiment of the present invention.

A first approach to the lens design is shown in FIG. 3. Reference numeral 10 denotes the interior lens cavity where the filament of an incandescent light source may be integrally formed. Surface 11 is the first lens surface, preferably ellipsoidal, or nearly ellipsoidal, that is, ellipsoidal with aspheric terms. Surface 12 is the second lens surface, preferably paraboloidal, or nearly paraboloidal, that is, paraboloidal with aspheric terms. Surface 13 is a cone surface or nearly a cone surface. For purposes of simulation, the slope of surface 13 is assumed to be 75°. FIG. 3 illustrates how surface 12 uses total internal reflection to collimate or redirect most of the light rays from source 10. It is noted, however, that light rays R in the lower hemisphere, below equatorial line E, are not effectively collimated or redirected by surface 12. Some of these rays R particularly exceed the critical angle of total internal reflection for surface 12. In order to utilize these rays without any additional optical components it therefore otherwise may be necessary to add a reflective film to surface 12 in the vicinity of rays R.

FIG. 4 shows a ray tracing of a preferred embodiment that utilizes light rays R. Fourth surface 14 and fifth surface 15 are toric or nearly toric surfaces that are used in combination with sixth surface 16 and seventh surface 17 to produce total internal reflection to redirect light rays R. The curvatures of fourth and fifth surfaces 14, 15 are generally equal and opposite so as to minimize aberration. Fourth and fifth surfaces 14 and 15 will particularly minimize aberration for non-point-like sources. The respective curvatures of fourth and fifth surfaces 14 and 15 are chosen so that at the peripheries of these surfaces 14, 15, incident light rays are within no more than one degree (1°) of the critical angle of total internal reflection. Light rays R are redirected so as to overlap with the light beams produced by surfaces 11, 12, and 13 to form a single, contiguous beam. Sixth and seventh surfaces 16, 17 are flat in this embodiment but may be curved to any desired shape to obtain a greater number of degrees of freedom in the lens design. FIG. 4 further includes a modification where portion 14' of surface 14 is made flat instead of toric as portion 14" to promote ease in manufacturing in the molding process. While an important purpose of the present invention is to minimize the use of conventional reflectors behind the light source 1, it may still be desirable in the present invention to utilize a smaller reflector (that is, a reflector of more limited angular extent) than is common in the prior art, as for example the reflective cup of the package of a light emitting diode (LED). Optionally, the lower portion of surface 14 may be coated with a reflective film **14*a* to increase the total amount of light collection as shown in FIG. 4**.

Three exemplary light rays, a, b, and c from three colatitude sectors are shown in a ray tracing of FIG. 4. Ray a is produced by the light source 1 and passes from the light source cavity 10 as ray $a_0$ to be refracted by ellipsoidal surface 11 to become ray $a_1$. Ray b is produced by the light source 1 as ray $b_0$ and passes from the light source cavity 10 to be totally internally reflected by paraboloidal surface 12 to become ray $b_1$; ray $b_1$ is then refracted by cone surface 13 to be emitted as ray $b_2$. The characteristics of surfaces 11, 12 and 13 are chosen with angles so that there is no overlapping or gaps between emitted beams of rays $a_1$, and $b_2$. Ray c is produced by the light source 1 as ray $c_0$ and passes from the light source cavity 10 to be refracted by toric surface 14 to become ray $c_1$; ray $c_1$ then passes through the air gap and is refracted by complementary curved toric surface 15 to produce ray $c_2$; ray $C_2$ is then totally internally reflected by cone surface 16 to produce ray $c_3$; ray $c_3$ finally passes through flat surface 17 to be emitted as ray $c_4$. The characteristics of surfaces 12 to 17 are chosen with angles so that there is no overlapping or gaps between emitted beams of rays $b_2$ and $c_4$. Thus, the beams corresponding to rays $a_1$, $b_2$ and $c_4$ combine to form a single integrated collimated beam, without any overlapping or gaps between the beams.

Figure 5:
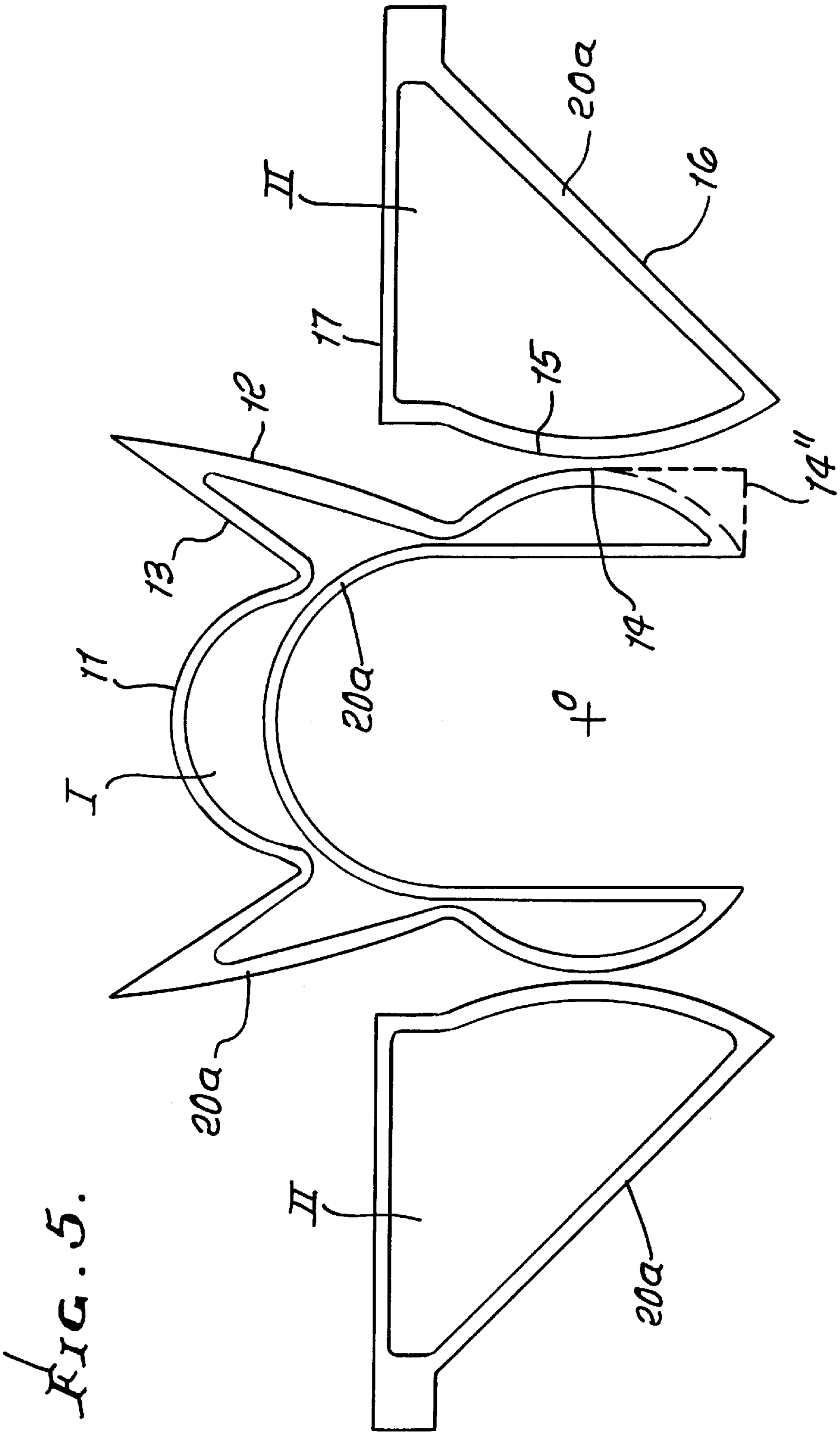
FIGS. 5 and 6 show similar embodiments of the present invention in cross-section.

FIG. 5 is similar to FIG. 4 but shows the entire lens configuration in a symmetric cross-section. The lens of FIG. 5 may be generated by axial rotation about a vertical line passing through the origin O and surface 11. This symmetric lens may also be stretched in a direction perpendicular to the plane of the paper to accommodate a non-cylindrical source or to provide other beam shaping characteristics. FIG. 5 shows that lens portion 14" of lens 14 may be made flat so as to ease manufacturing in the molding process.

The lens of FIGS. 4 and 5 is basically formed as two parts or pieces. The first part I consists of surfaces 11, 12, 13 and 14, while the second part II consists of surfaces 15, 16 and 17. Second part It may optionally be formed integral with the socket of the light source or second part II may be formed to snap together with first part I. First part I and second part II may be manufactured individually and subsequently joined together, or they may be molded integrally together, or they may remain separate pieces. First part I may be manufactured from a different material from second part II to compensate for various aberrations. First part I may for instance be made from plastic while second part II is made from glass, or the first and second parts I, II may be manufactured from different types of glass and plastic having complementary wavelength dispersion curves. Preferably, if the lens is made from glass, it should be a high temperature glass with a low thermal expansion coefficient to accommodate hot light sources. If the lens is utilized with a cold light source, it may be made of an optically transparent material such as polycarbonate. Silicone (some compositions of which have a refractive index 1.43) has advantages as a lens material in that it can withstand the elevated temperatures of an incandescent light source, and can be cast with a negative draft with low pressure. Because silicone is a flexible material that tends to attract dust particles, it may be desirable to coat at least a portion of the optical lens with a rigid shell 20 as a cover or container. The rigid shell 20 may be made of a material such as polycarbonate or acrylic that acts to protect the silicone optical lens and its surfaces. A rigid container *20a* might particularly coat both the front and back surfaces of the optical lens, while a rigid cover *20b* might particularly coat only the front surfaces of the optical lens. Furthermore, it is possible to encapsulate a liquid or gelatinous material within a rigid container *20a* made of polycarbonate or acrylic and still maintain the optical functions of the optical lens of the present invention. Silicone oils and silicone gels may be used instead of silicone solids to make a liquid optical lens with equivalent optical properties. FIG. 5 shows a rigid container *20a* while FIG. 6 shows a rigid cover *20b*.

Figure 6:
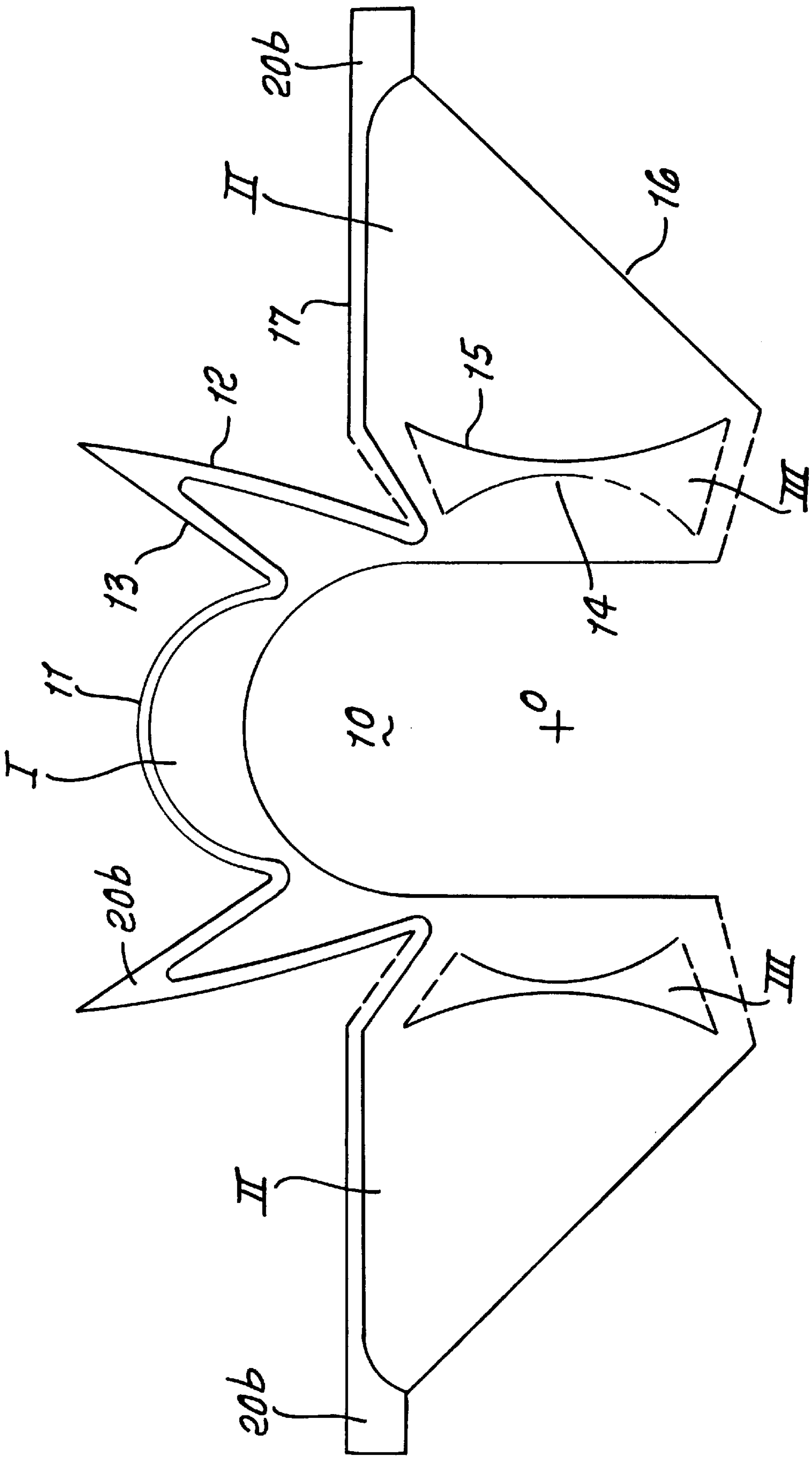
Figure 7:
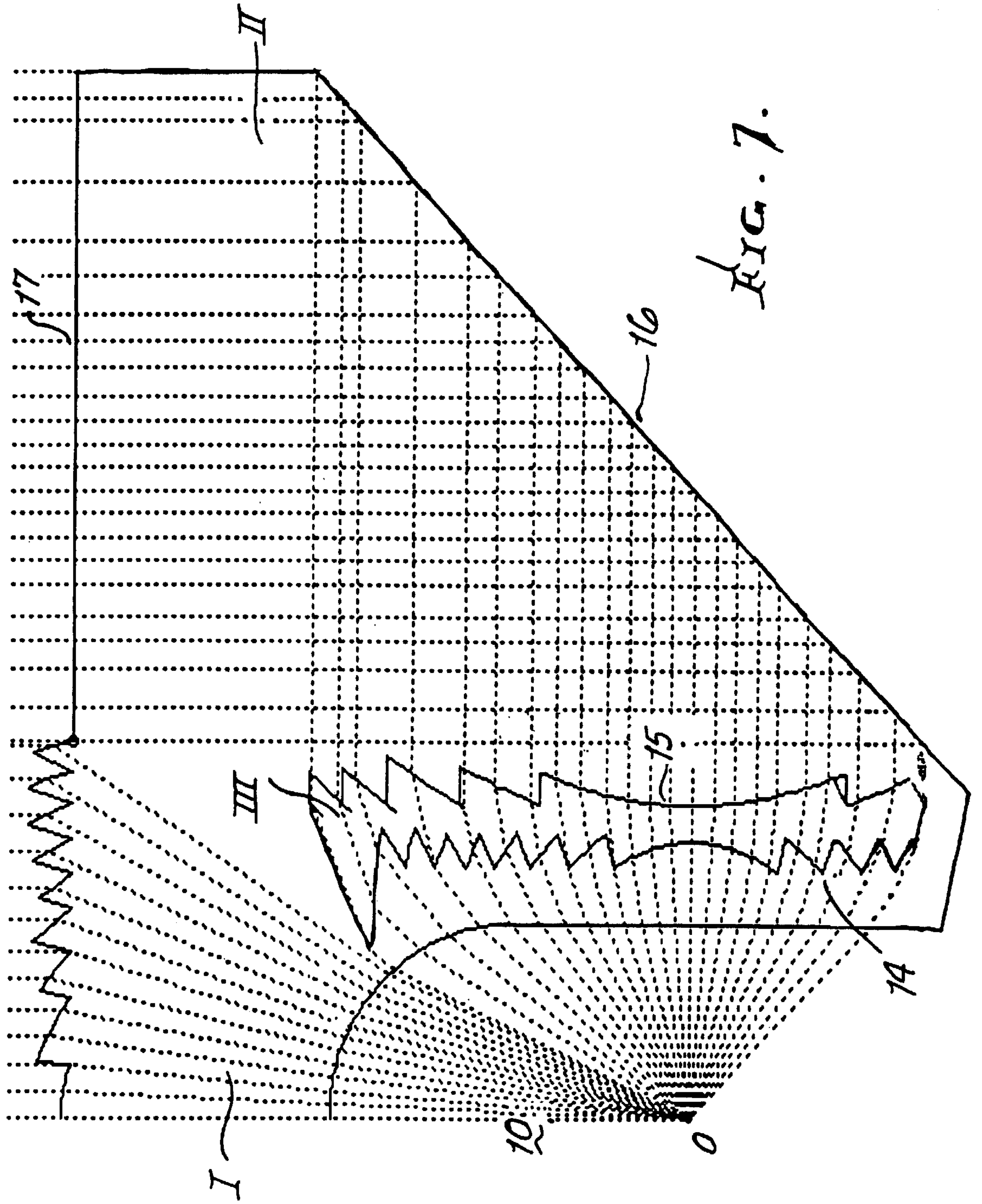
FIG. 7 shows an embodiment of the present invention where the surfaces are Fresnel surfaces.
Figure 11:
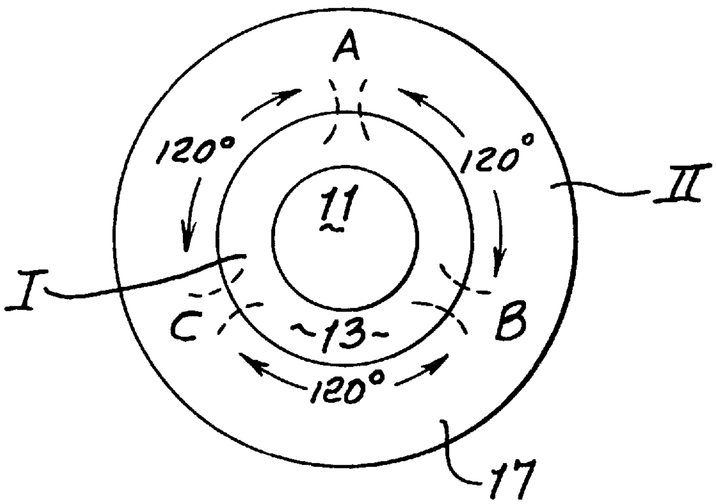
FIG. 11 shows a head on view of the optical lens of the present invention where the two parts are joined at a plurality of distinct angular locations.

FIG. 6 shows a design that is similar to FIG. 5 but that may optionally be formed as only one part with an internal air space. Dotted Lines in FIG. 6 show how first part I is joined to second part II to form air space III. The points of connection between the first part I and the second part II need not be continuous all the way around the optical lens. First part I and second part II may for instance be joined at only three distinct locations A, B, and C arranged at spaced angles of 120° with respect to one another as seen by looking at the lens head on. See FIG. 11. The number of connection points of course may be other than three. Connecting part I to part II at only discrete locations A, B, and C may have the advantages of making the optical lens easier to manufacture as well as reducing the required amount of transparent optical material. FIG. 7 similarly shows a ray tracing of an embodiment where first part I is joined to second part II to form air space III, but now the surfaces of the lens have been made to be Fresnel surfaces. It is also possible to completely eliminate second part II in the embodiment of FIG. 4 and to still maintain increased light utilization by extending refracting surface 14 further below the equatorial plane of the light source; however, in this instance it may be necessary to deposit a reflective film on the lower portion of surface 14 due to the high degree of surface curvature.

Figure 8:
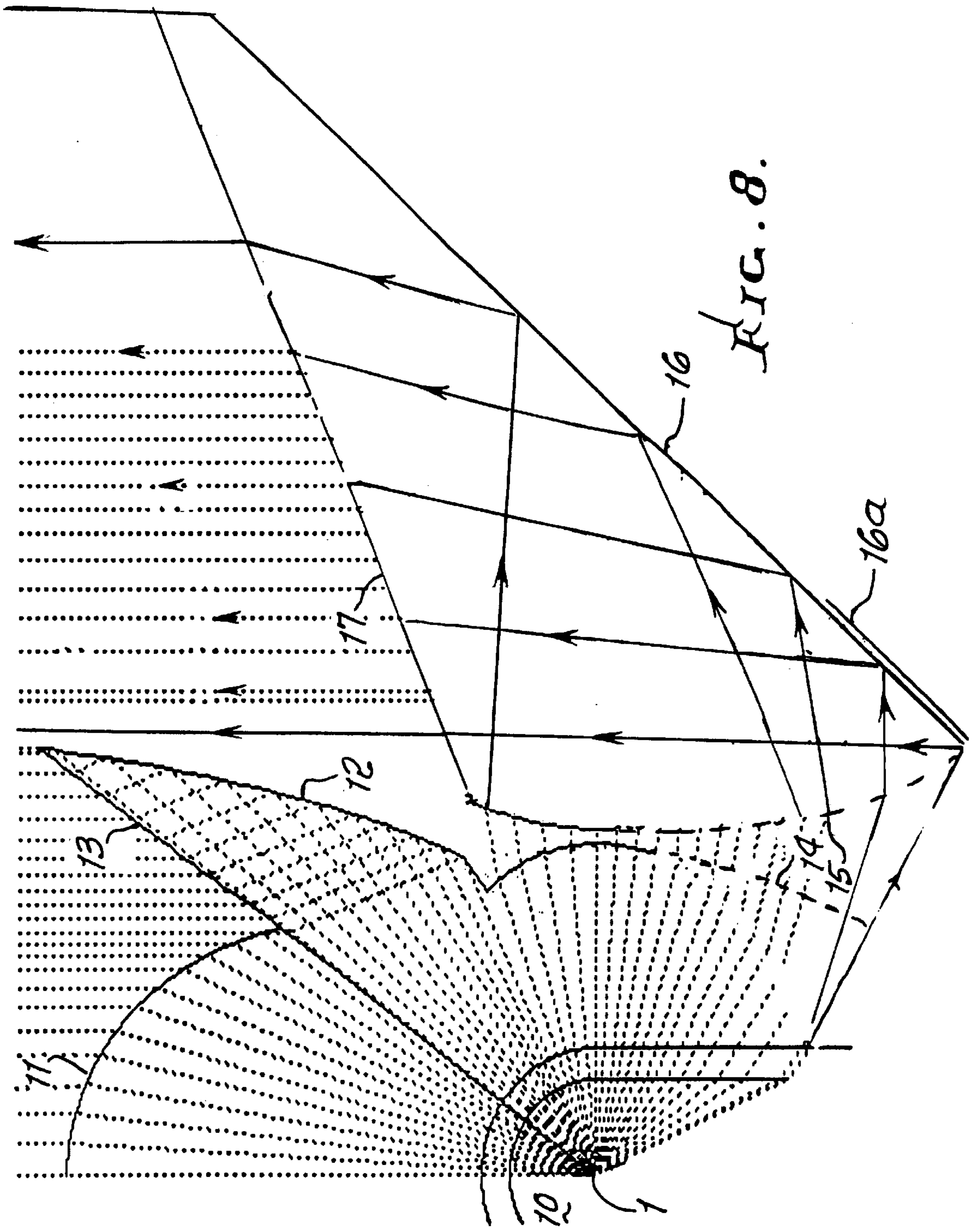
FIG. 8 shows still another embodiment of the present invention illustrating a change in the internal reflection angle.
Figure 9:
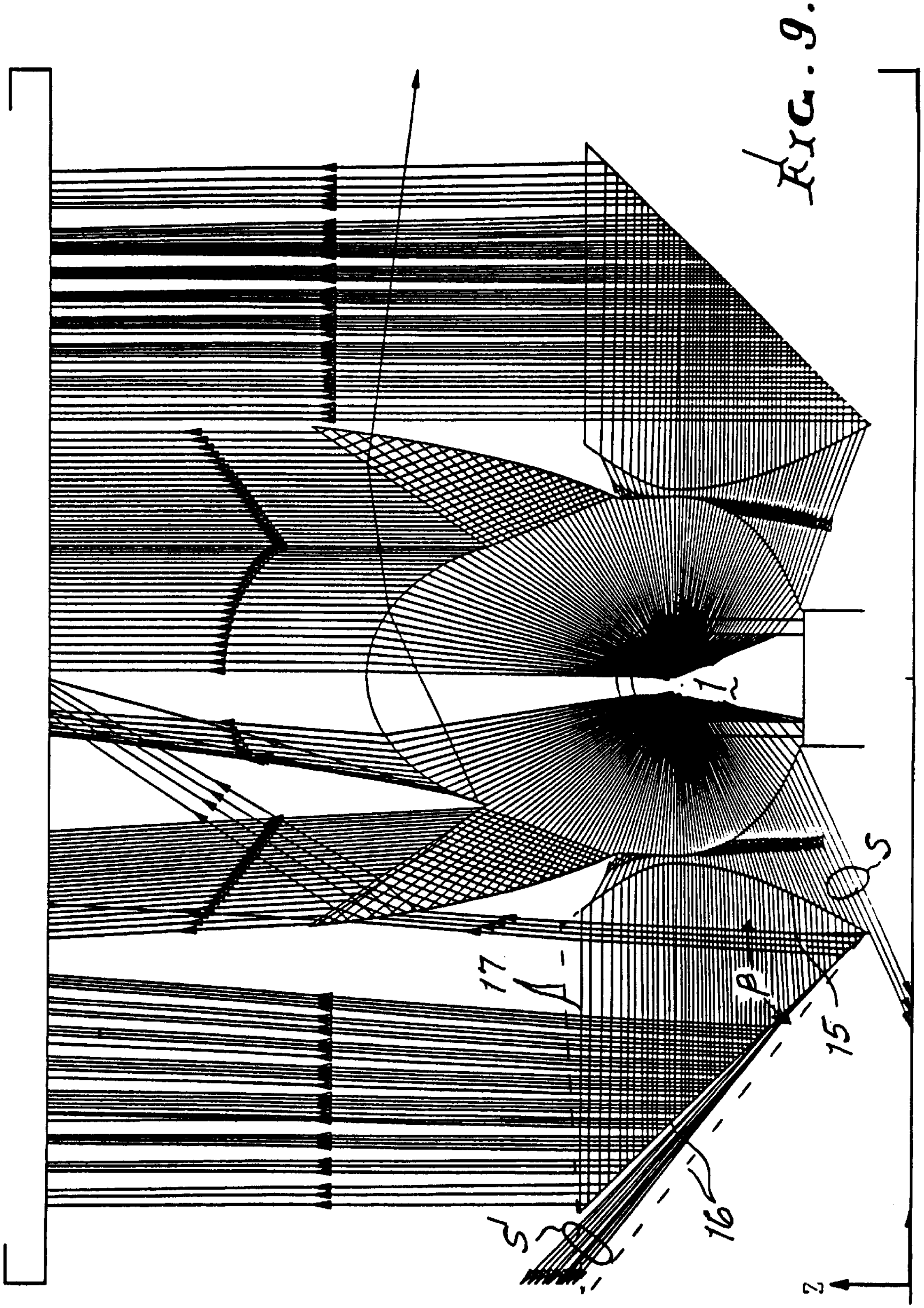

FIG. 8 shows still another embodiment of the present invention where the angle of internal reflection surface 16 is varied to increase the total amount of light acceptance from the lowest angular sectors of the fight source. The angle of refractive surface 17 is correspondingly other than horizontal in this embodiment in order to produce collimation of the output beam. This embodiment may optionally require a reflective coating 16a on at least a portion of internal reflection surface 16 in the case where the required internal reflection angle exceeds the critical angle of total internal reflection for the material. The reflective coating 16a may be either a metallic coating or other reflective film. This reflective coating 16a may in some instances be present only on the lower portion of the internal reflection surface 16 in order to increase the amount of light collection from the lower hemisphere of the light source. The required radius of curvature of refractive surfaces 14, 15 correspondingly increases as the angle of internal reflection surface 16 increases above the critical angle of total internal reflection. It is also possible to give optical power to either or both of surfaces 16, 17 by curving surface 16 to form a concave or convex reflector and curving surface 17 to form a concave or convex lens. Curved surfaces 16, 17 may also be manufactured as either Fresnel surfaces or TIR lens surfaces.

Figure 9:
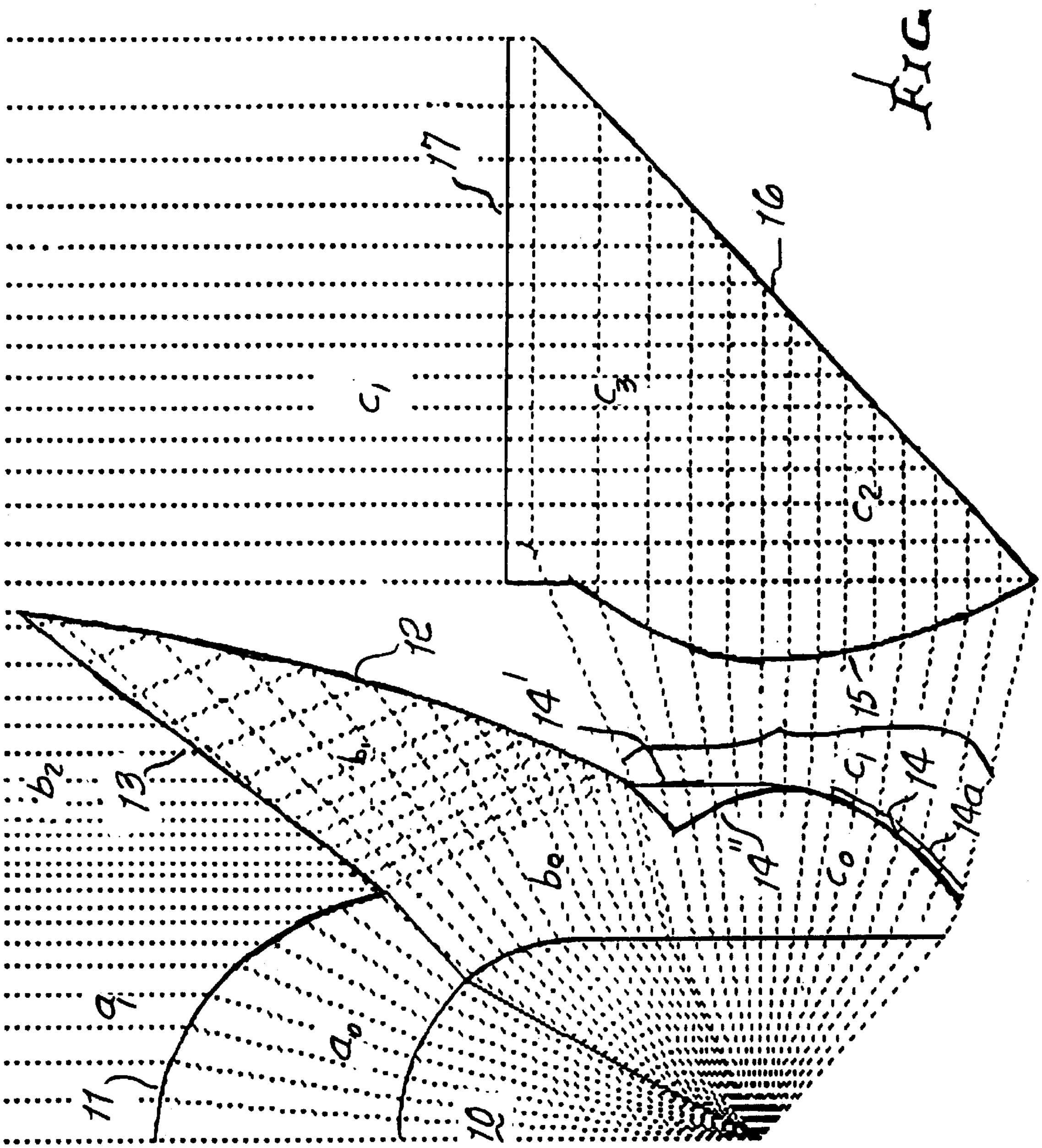
FIG. 9 illustrates a ray tracing simulation of another embodiment showing the desirability of increasing the total internal reflection angle to accommodate rays from the lower hemisphere of the light source.

The left half of FIG. 9 shows a ray tracing simulation of an extended filament light source 1 that captures peripheral rays S from the lower hemisphere of the light radiation pattern. The filament 1 in this simulation is taken to be positioned slightly to the left of its original location in the horizontal plane in order to represent an extended filament light source 1. (The right half of FIG. 9 shows a conventional ray tracing.) This figure shows that, as surface 15 is enlarged to capture more of these peripheral rays S from the extended filament light source 1, the incidence angle of some of rays S exceeds the critical angle of the material so that rays S' escape from the lens. In order to contain these rays S' within the lens, the angle of surface 16 is increased from the conventional angle $\beta=45°$, as shown by the solid line in FIG. 9, to for example $\beta \cong 50°$ or more, so that these rays S' are totally internally reflected. The slope of output surface 17 may similarly be varied to collimate the output rays. As always, the critical angle of total internal reflection will depend upon the index of refraction of the material.

Figure 10:
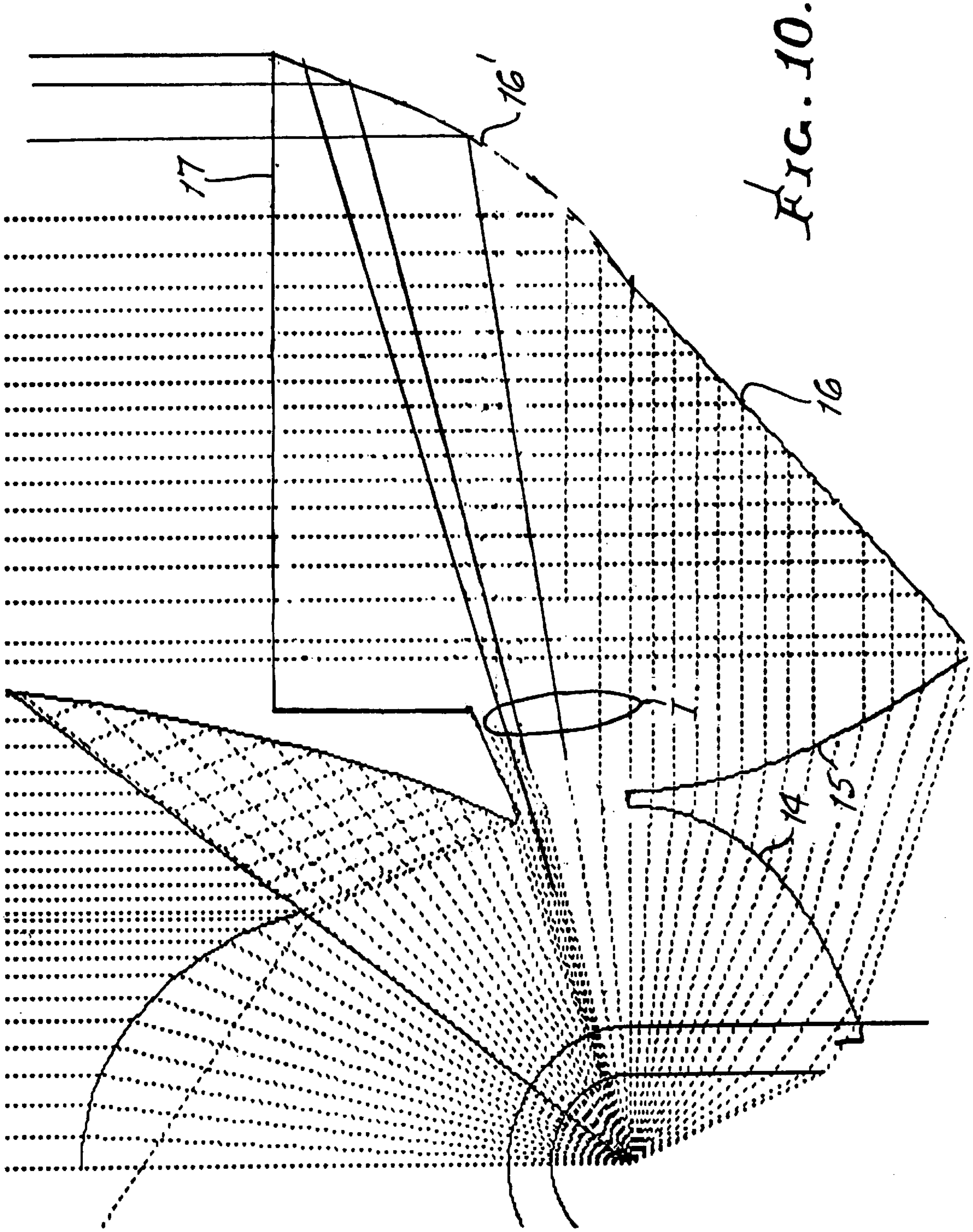
FIG. 10 is another embodiment showing modifications of lens surfaces to collimate light rays when the two lens parts are made integral.

FIG. 10 shows still another embodiment where part I and part II are either formed as one integral piece or are made to snap together. Due to difficulties in producing a mold of a one piece design, it may be preferable to initially mold two separate pieces, and then subsequently to snap them together to form one integral lens unit. Joining in this manner has the advantages of ease in handling, and reduction in relative positioning errors, of the two pieces. A modification must be made in this embodiment in consideration of the fact that rays T are no longer refracted when the air gap is eliminated in the upper portion of surfaces 14 and 15. In this case, surface 17 is raised in the vertical direction to permit rays T to pass without internal reflection until they reach an extension 16' of surface 16. In order to collimate rays T at output surface 17, it is necessary to give curvature to extension 16' of surface 16. Here, extension 16' is a spiral section.

Figure 12:
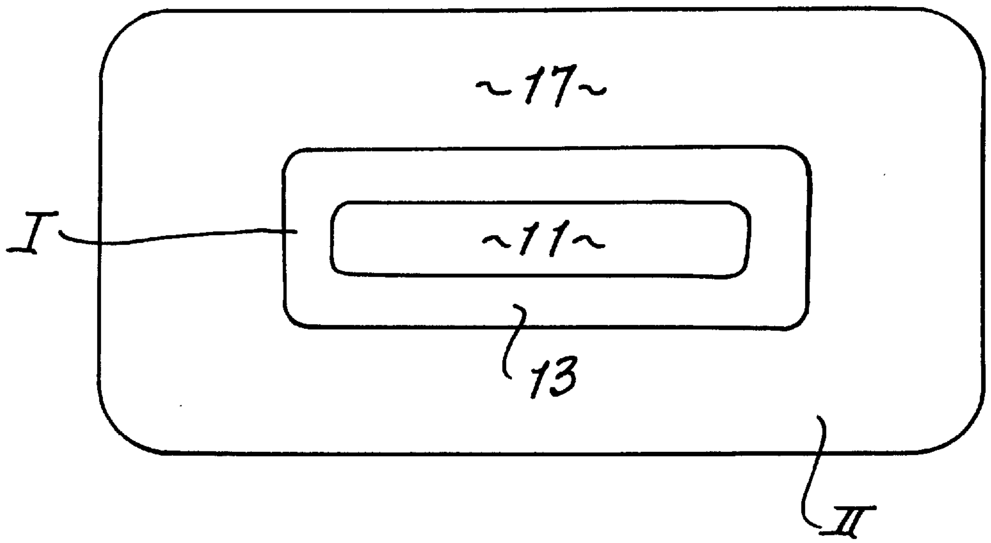
FIG. 12 shows a head on view of the optical lens of the present invention utilizing a linearly symmetric arrangement to accommodate linear light sources or light source arrays.

While the embodiments of the lens element of the present invention have mainly been described as encompassing a rotationally symmetric or stretched rotationally symmetric lens structure, a linear analog of the present invention is feasible to accommodate light sources such as line sources (for example, fluorescent tubes) or linear arrays of sources (such as a line of light emitting diodes). FIG. 12 shows a head on view of the optical lens of the present invention in a linearly symmetric design to accommodate an extended linear light source or linear light source array.

The various design parameters of the present invention can be tailored to specific applications using the computer simulations described herein. The invention should not be limited to the embodiments described herein but should construed to includes all modifications within the scope and spirit of the invention.

We claim:

1. An optical lens for achieving high efficiency beam formation from a light source radiating light into both upper and lower hemispheres, comprising:

a) a system of optical elements, each element of which redirects light from said source radiating from a particular sector of said hemispheres, b) said system of optical elements having a first surface that is ellipsoidal or nearly ellipsoidal, said first surface characterized as refracting a first group of light rays from a first sector of said light source, c) said system of optical elements having a second surface that is paraboloidal or nearly paraboloidal, said second surface characterized as producing total internal reflection of a second group of light rays from a second sector of said light source.

2. An optical lens for achieving high efficiency beam formation from a light source radiating light into both upper and lower hemispheres, comprising:

a) a system of optical elements, each element of which redirects light from said source radiating from a particular sector of said hemispheres, b) said system collecting substantially all of the light from both of said hemispheres to form a light beam of specified angular properties, c) said system characterized in that none of said optical elements blocks light from another of said optical elements and none of said optical elements allows light to pass uncollected between said optical elements, d) said optical elements having one or more optical surfaces that redirect light by one of the following:

refraction total internal reflection e) said optical elements forming an output light beam with substantially contiguous portions, f) said optical lens being formed from one or more substantially transparent optical materials, each having a respective index of refraction and forming an optical cavity such that the optical lens is integral with or in optical contact with said light source, said system of optical elements having a first surface that is ellipsoidal or nearly ellipsoidal, said first surface characterized as refracting a first group or light rays from a first sector of said light source, and wherein said system of optical elements has a second surface that is paraboloidal or nearly paraboloidal, said second surface characterized as producing total internal reflection of a second group of light rays from a second sector of said light source.

3. The optical lens of claim 2 wherein said system of optical elements has a third surface that is a cone surface or nearly a cone surface, said third surface characterized as refracting said second group of light rays from said second sector after said second group of light rays are totally internal reflected by said second surface.

4. The optical lens of claim 3 wherein said system of optical elements has a fourth surface that is toric or nearly toric, said fourth surface characterized as refracting a third group of light rays from a third sector of said light source, said third group of light rays passing from said light source through said fourth surface.

5. The optical lens of claim 4 wherein said fourth surface has a lower portion that is coated with a reflective film.

6. The optical lens of claim 3 wherein g) said system of optical elements has fourth and fifth surfaces that are toric or nearly toric, said fourth and fifth surfaces being separated by an air gap, h) said fourth and fifth surfaces characterized as refracting a third group of light rays from a third sector of said light source, i) said third group of light rays passing from said light source through said fourth surface and then through said fifth surface.

7. The optical lens of claim 6 wherein j) said system of optical elements has a sixth surface that is a cone surface or nearly a cone surface, and a seventh surface that is flat or nearly flat, k) said sixth surface being a TIR surface for totally internally reflecting said third group of rays from said third sector after having been refracted by said fourth and fifth surfaces, l) said seventh surface passing said third group of rays after having been totally internally reflected by said sixth surface.

8. The optical lens of claim 6 wherein:

m) said system of optical elements has a sixth surface that is a cone surface or nearly a cone surface, and a seventh surface that is a cone surface or nearly a cone surface, n) said sixth surface internally reflecting said third group of rays from said third sector after having been refracted by said fourth and fifth surfaces, o) said seventh surface refracting said third group of rays after having been internally reflected by said sixth surface.

9. The optical lens of claim 8 wherein said sixth surface has at least a portion thereof that is coated with a metallic or other reflective film.

10. The optical lens of claim 6 wherein j) said system of optical elements has a sixth surface that is concave or convex with reflective optical power, and a seven surface that is concave or convex with refractive optical power, k) said sixth surface internally reflecting said third group of rays from said third sector after having been refracted by said fourth and fifth surfaces, l) said seventh surface refracting said third group of rays after having been internally reflected by said sixth surface.

11. The optical lens of claim 1 wherein said optical lens is of one-piece construction and includes an internal air gap, said internal air gap defining internal lens surfaces.

12. The optical lens of claim 1 wherein said system of optical elements has one or more surfaces that are Fresnel surfaces or TIR lens surfaces, for receiving incident light.

13. An optical lens for achieving high efficiency beam formation from a light source radiating light into both upper and lower hemispheres, comprising:

a) a system of optical elements, each element of which redirects light from said source radiating from a particular sector of said hemispheres, b) said system collecting substantially all of the light from both of said hemispheres to form a light beam of specified angular properties, c) said system characterized in that none of said optical elements blocks light from another of said optical elements and none of said optical elements allows light to pass uncollected between said optical elements, d) said optical elements having one or more optical surfaces that redirect light by one of the following:
refraction
total internal reflection e) said optical elements forming an output light beam with substantially contiguous portions, f) said optical lens being formed from one or more substantially transparent optical materials, each having a respective index of refraction and forming an optical cavity such that the optical lens is integral with or in optical contact with said light source, g) and wherein said optical lens is of two-piece construction, one piece having first, second, third, and fourth surfaces, and a second piece having fifth, sixth and seventh surfaces.

14. The optical lens of claim 13 wherein said first and second pieces are joined at a plurality of distinct and separate locations.

15. The optical lens of claim 13 wherein said first and second pieces are joined at three distinct locations with 120° angular spacing therebetween.

16. The optical lens of claim 13 wherein said first and second pieces consist of different optical materials.

17. The optical lens of claim 1 wherein said light source has a light-emitting filament, and said optical lens has a light-utilization efficiency from said filament to said output beam in the range of 75% to 90%.

18. An optical lens for achieving high efficiency beam formation from a light source radiating light into both upper and lower hemispheres, comprising:

a) a system of optical elements, each element of which redirects light from said source radiating from a particular sector of said hemispheres, b) said system collecting substantially all of the light from both of said hemispheres to form a light beam of specified angular properties, c) said system characterized in that none of said optical elements blocks light from another of said optical elements and none of said optical elements allows light to pass uncollected between said optical elements, d) said optical elements having one or more optical surfaces that redirect light by one of the following:
refraction
total internal reflection e) said optical elements forming an output light beam with substantially contiguous portions, f) said optical lens being formed from one or more substantially transparent optical materials, each having a respective index of refraction and forming an optical cavity such that the optical lens is integral with or in optical contact with said light source, g) and wherein at least one of said substantially transparent optical materials is a high temperature glass with a low thermal expansion coefficient.

19. An optical lens for achieving high efficiency beam formation from a light source radiating light into both upper and lower hemispheres, comprising:

a) a system of optical elements, each element of which redirects light from said source radiating from a particular sector of said hemispheres, b) said system collecting substantially all of the light from both of said hemispheres to form a light beam of specified angular properties, c) said system characterized in that none of said optical elements blocks light from another of said optical elements and none of said optical elements allows light to pass uncollected between said optical elements, d) said optical elements having one or more optical surfaces that redirect light by one of the following:
refraction
total internal reflection e) said optical elements forming an output light beam with substantially contiguous portions, f) said optical lens being formed from one or more substantially transparent optical materials, each having a respective index of refraction and forming an optical cavity such that the optical lens is integral with or in optical contact with said light source, g) and wherein at least one of said substantially transparent optical materials is a flexible, solid, optical material.

20. The optical lens of claim 19 wherein said flexible, solid, optical material is silicone.

21. The optical lens of claim 20 wherein said lens includes a rigid shell and at least a portion of said flexible, solid, optical material is covered or contained within said rigid shell.

22. The optical lens of claim 21 wherein said rigid shell consists essentially of a polycarbonate or an acrylic material.

23. An optical lens for achieving high efficiency beam formation from a light source radiating light into both upper and lower hemispheres, comprising:

a) a system of optical elements, each element of which redirects light from said source radiating from a particular sector of said hemispheres, b) said system collecting substantially all of the light from both of said hemispheres to form a light beam of specified angular properties, c) said system characterized in that none of said optical elements blocks light from another of said optical elements and none of said optical elements allows light to pass uncollected between said optical elements, d) said optical elements having one or more optical surfaces that redirect light by one of the following:
refraction
total internal reflection e) said optical elements forming an output light beam with substantially contiguous portions, f) said optical lens being formed from one or more substantially transparent optical materials, each having a respective index of refraction and forming an optical cavity such that the optical lens is integral with or in optical contact with said light source, g) and wherein said lens includes a rigid shell, and said substantially transparent optical material consists of a liquid or gelatinous lens material enclosed within said rigid shell.

24. The optical lens of claim 23 wherein said liquid or gelatinous lens material consists essentially of silicone oil or silicone gel.

25. The optical lens of claim 1 including a light source structure, wherein said optical lens is incorporated into said light source structure, said light source structure being one of the following:

a headlight of an automobile a bicycle lamp a flashlight.

26. The optical lens of claim 1 wherein said optical lens includes said light source.

27. The optical lens of claim 1 wherein said specified angular properties of said beam include collimation or substantial collimation of the light, bringing the beam light to a focus or near focus, or causing the beam light to diverge.

28. The optical lens of claim 1 wherein said system of optical elements collects light from a solid, angular region of nearly 4π steradians or 180°.

29. The optical lens of claim 1 wherein said optical lens is characterized by one of the following:

rotational symmetry stretched rotational symmetry to accommodate to said beam for said light source.

30. The optical lens of claim 1 wherein said optical lens has linear symmetry to accommodate to said beam from said light source.

31. An optical lens for achieving beam formation from a light source in a first body having a cylindrical surface terminating at a first dome, comprising in combination:

a) a second body extending about said first dome and defining a second dome for refracting light transmitted in a first region of said first dome, said domes having a common axis, b) and a first reflecting surface surrounding said domes for reflecting light transmitted via a second region of said first dome.

32. The combination of claim 31 wherein said first surface is paraboloidal or near paraboloidal, said first surface being a TIR surface.

33. The combination of claim 31 including a second lens surface between said second dome and said first surface for refracting light reflected by said first reflecting surface.

34. The combination of claim 33 wherein said second lens surface is conical or nearly conical.

35. The combination of claim 33 wherein light transmitted by said second dome and light refracted by said second lens surface is collimated.

36. The combination of claim 31 including additional lens surfaces extending about said cylindrical surface to redirect light transmitted via said cylindrical surface.

37. The combination of claim 36 wherein said additional lens surfaces define at least three such surfaces to collimate said light with respect to light transmitted by said second dome and light refracted by said second lens surfaces.

* * * * *